United States Patent [19]

Meline

[11] Patent Number: 4,527,335

[45] Date of Patent: Jul. 9, 1985

[54] AVERAGING AXIAL-DIAMETRAL STRAIN MEASURING EXTENSOMETER

[75] Inventor: Harry R. Meline, Minnetonka, Minn.

[73] Assignee: MTS Systems Corporation, Eden Prairie, Minn.

[21] Appl. No.: 518,379

[22] Filed: Jul. 29, 1983

[51] Int. Cl.³ .................. G01B 7/16; G01N 19/06
[52] U.S. Cl. .................. 33/147 D; 33/148 D; 73/781
[58] Field of Search ............ 33/143 L, 147 D, 147 N, 33/148 D, 148 H, 149 J, 178 E, DIG. 13; 73/781, 782, 860

[56] References Cited

U.S. PATENT DOCUMENTS

| | | | |
|---|---|---|---|
| 2,416,664 | 2/1947 | Ruge | 33/147 D |
| 2,663,085 | 12/1953 | Ruge | 33/147 D |
| 2,921,282 | 1/1960 | Krouse et al. | 33/147 D |
| 3,402,472 | 9/1968 | Riley | 33/147 D |
| 3,789,508 | 2/1974 | Meline | 33/148 D |
| 3,802,781 | 4/1974 | Wright | 33/147 D |
| 4,010,640 | 3/1977 | Krieger, Jr. | 33/147 D |
| 4,251,918 | 2/1981 | Duggan | 33/148 D |

Primary Examiner—Richard R. Stearns
Attorney, Agent, or Firm—Kinney & Lange

[57] ABSTRACT

An extensometer is used for measuring axial and diametral strains in a material test specimen. The extensometer comprises an assembly of extensometer sections positioned on diametrally opposite sides of the specimen with specimen engaging points spaced axially along the specimen. The extensometer assembly is arranged so that the two extensometer sections will average the axial strain measured by the two extensometer sections. Also, if desired, the two extensometer sections may provide an indication of the average change in diameter of the specimen at the location of the upper contact points and at the location of the lower contact points of the extensometer sections on opposite sides of the specimen. The support system between the extensometer sections provides for the necessary degrees of freedom to provide measuring only in the axis desired, and sufficient restraint in other axes to insure that accurate measurements are obtained.

16 Claims, 6 Drawing Figures

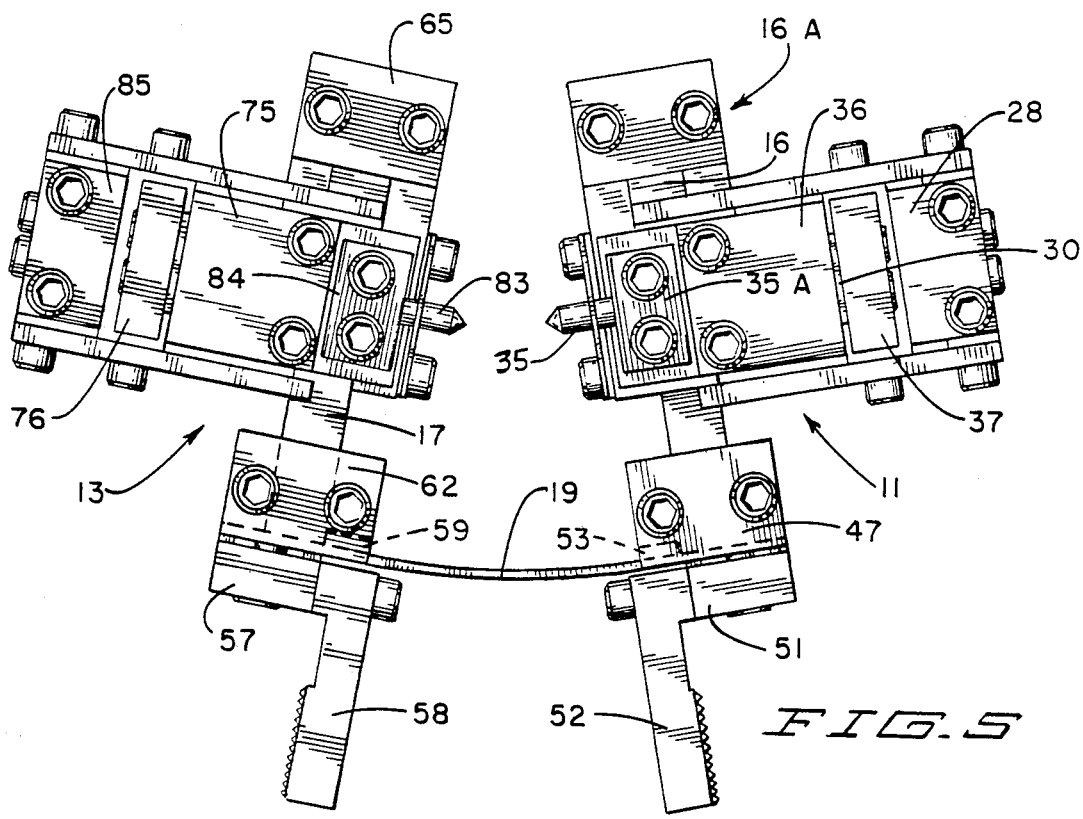
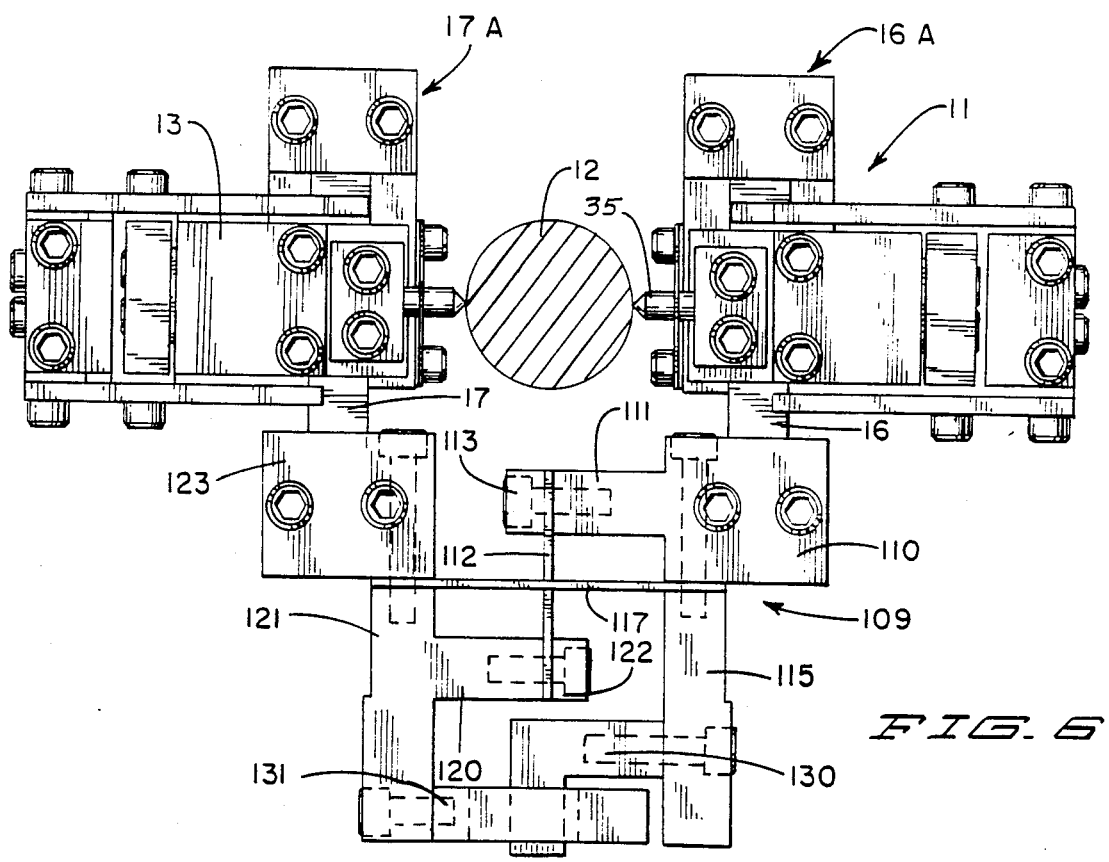

AVERAGING AXIAL-DIAMETRAL STRAIN MEASURING EXTENSOMETER

BACKGROUND OF THE INVENTION

1. Field of the Invention

The present invention relates to averaging axial and-/or axial-diametral extensometers.

2. Description of the Prior Art

In the prior art, so-called "bi-axial" strain measurement extensometers have been known. For example, U.S. Pat. No. 4,251,918 shows a type of bi-axial extensometer which is used for measuring axial and/or diametral strains in material test specimens. The device shown in that patent includes four extensometer arms, two on each side of the specimen. The arms on opposite sides of the specimen are connected by a flat spring member and are oriented to have upper and lower arms that are opposite from each other. The arms are constructed to provide means for measuring axial strain and also for measuring diametral changes of the specimen. The diametral measurement is biased toward sensing the diametral changes between the specimen engaging points of the lower arms.

U.S. Pat. No. 3,789,508 illustrates an extensometer which has a cross flexure support between the arms. The individual extensometer sections of the present invention also use such mounting for the arms of the sections for measuring axial strain. The cross flexure mounting permits relative movement between the outer ends of the arms in direction along the axis of the specimen, but restrains movements in other axes.

Reference is made to copending application Ser. No. 474,700, filed Mar. 11, 1983 now U.S. Pat. No. 4,491,021 for An Axial-Torsional Extensometer, which illustrates extensometer sections mounted on opposite sides of a specimen, and diametrically opposed, but resupported to have different degrees of freedom to measure torsional strains, as opposed to diametral strains and also measuring average axial changes as in the present device.

SUMMARY OF THE INVENTION

The present invention relates to an extensometer assembly comprising a pair of extensometer sections on opposite sides of the specimen, engaging the specimen at directly diametrically opposed points from the other extensometer section. Each of the sections has two arms, with the specimen engaging members of each extensometer section spaced axially from the other arm of such section.

The extensometer arms that carry the specimen engaging members are aligned so that a line connecting the points of contact are parallel to the axis of the specimen when the specimen is at rest. The arms of each section tend to separate when the specimen is elongated. The strain induced movement of the arms of each section is separately sensed, and this permits averaging of the strain on opposite sided of the specimen to eliminate errors related to bending of the specimen for example, and to permit, if desired, measuring the differential bending strain on opposite sides of the specimen.

The two extensometer sections are supported relative to each other by the support system comprising flexure beams or straps mounted in a manner to permit the necessary degrees of freedom. The straps are provided to support each of the individual extensometer sections and have first ends clamped to the respective extensometer section. The straps extend laterally of the specimen and the straps have planes generally perpendicular to the axis of the specimen on opposite sides thereof. An alignment bracket assembly holds the opposite ends of the straps. The bracket assembly includes support alignment flexure beam means for alignment purposes that couple the two extensometer sections together. In one form, the alignment flexure beam that is used for supporting the two extensometer sections together has a plane generally parallel to the axis of the specimen, and will bend about an axis lying in such plane when the diameter of the specimen changes, and the two extensometer sections thus tend to move apart or together relative to each other.

The alignment flexure beam that joins the two extensometer sections together may be provided with strain gages to measure the amount of change in diameter of the specimen because such changes in diameter will change the strain in the alignment flexure beam. The diameter measurements are made at two axially spaced cross sectional planes, each plane lying on the points of contact of the diametrically opposed arms of the respective extensometer sections.

It should be pointed out that some "biasing" of this average diameter measurement may be achieved by shifting the extensometer section support straps slightly off the bisecting plane between the points of contact of the two arms of the same extensometer section.

When the support straps for the extensometer sections are properly located, the connecting alignment flexure beam means that spans the specimen and holds the two extensometer sections together may provide a resilient force that will urge the specimen engaging points of both extensometer sections against the specimen sufficiently so that measurements can be taken without any external clips or other members to hold such points in engagement with the specimen.

As shown, installation arms that can be grasped by a user to spread the two extensometer sections apart for installation on the specimen may be provided. These arms are essentially handles that can be grasped between the thumb and forefinger of a user to open the extensometer sections sufficiently to permit quick and easy installation on a specimen.

The alignment flexure beam is bent about an axis lying in its plane and perpendicular to its longitudinal axis for measuring the change in diameters, and also is bent about this axis for spreading the extensometer sections apart for installation. If desired, the spring loading of the alignment flexure beam can be achieved by a reverse prebend of the alignment flexure beam so that when the specimen has a diameter equal to the rated diameter for the extensometer assembly, the alignment flexure beam will be substantially straight and will exert enough force so that the specimen engaging points will be operative as they engage the specimen to hold the extensometer assembly on the specimen with sufficient force so it will not slip during strain loading.

BRIEF DESCRIPTION OF THE DRAWINGS

FIG. 5 is a bottom plan view taken generally along the same line as FIG. 2 showing the extensometer assembly in its normal position when it is not attached to a specimen; and FIG. 6 is a bottom plan view of a modified form of the invention for showing a cross flexure alignment assembly for supporting the two extensometer sections relative to each other.

DETAILED DESCRIPTION OF THE PREFERRED EMBODIMENT

Figure 1:
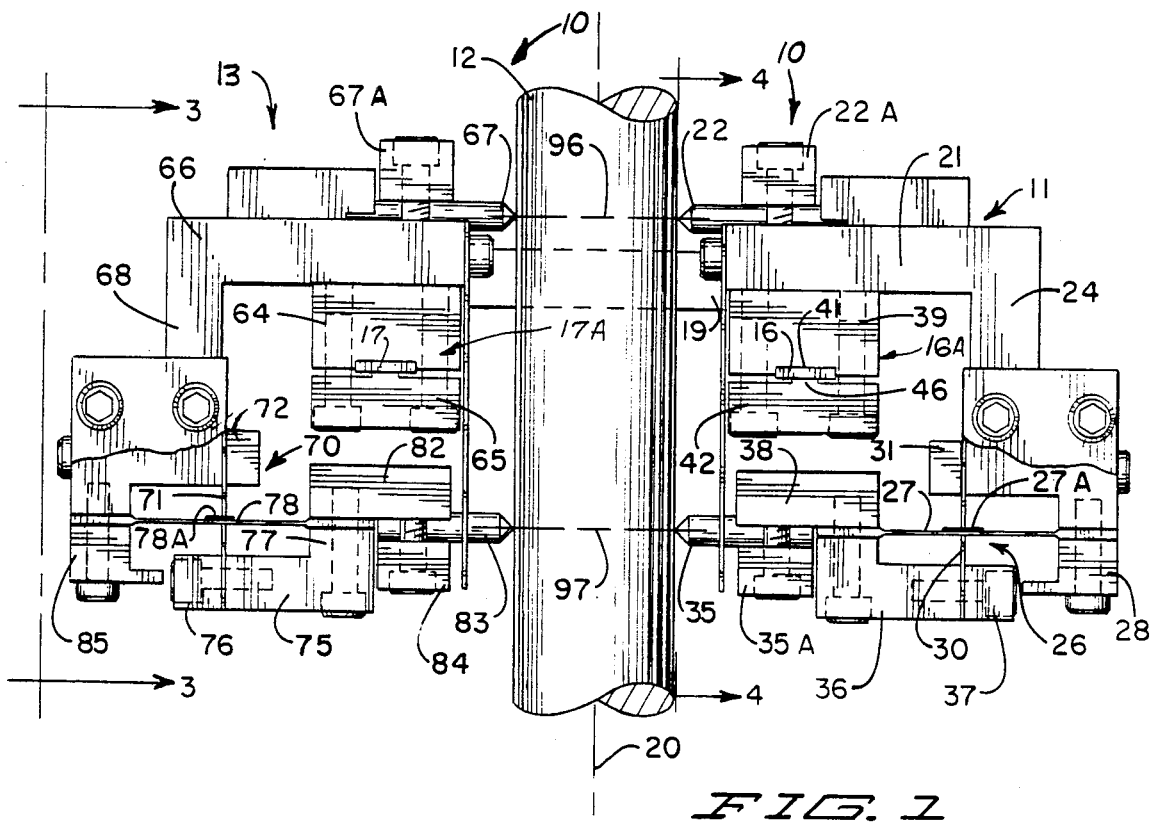
FIG. 1 is a side elevational view of an extensometer assembly made according to the present invention showing it installed on a specimen with parts in section and parts broken away.
Figure 2:
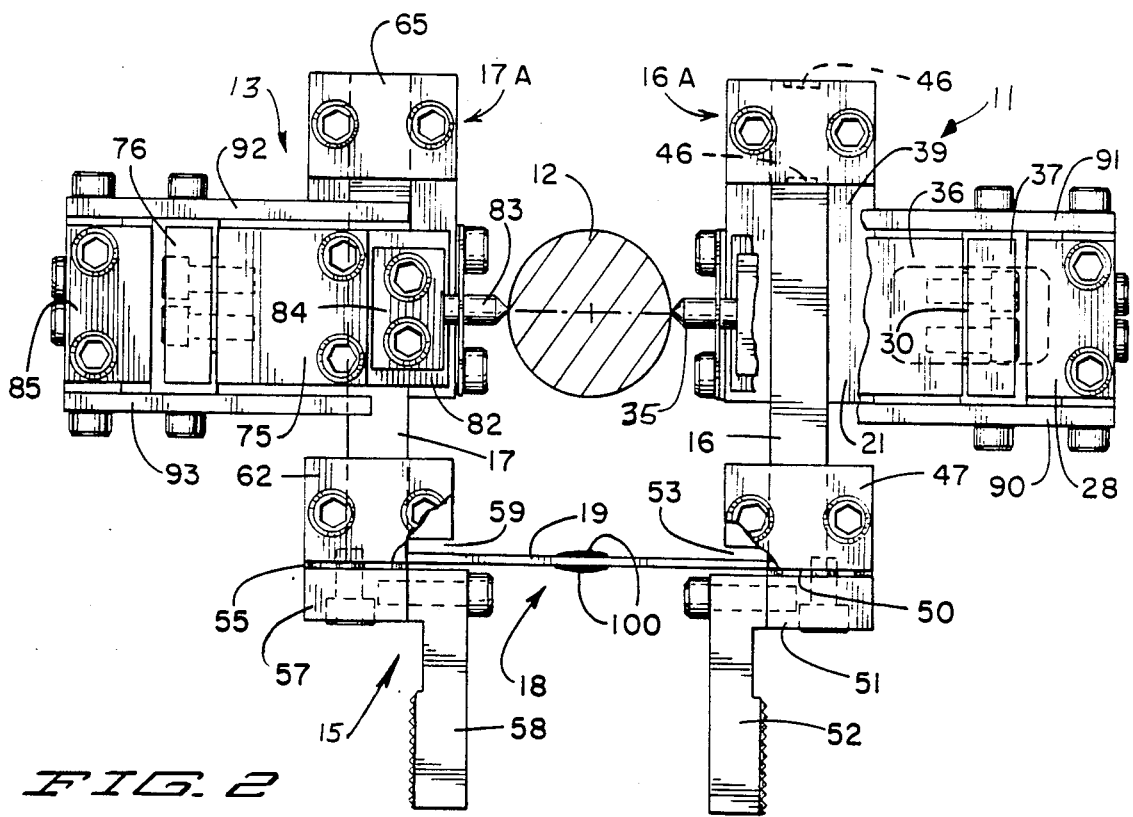
FIG. 2 is a bottom plan thereof.

Referring to FIG. 1, an extensometer assembly indicated generally at 10 comprises a first extensometer, or extensometer section 11, and a second extensometer, or extensometer section 13. Extensometer section 11 is mounted on one side of a specimen 12, the strain in which is to be measured, and the second extensometer section 13 is mounted diametrically opposite from the first extensometer section 11. As shown in FIG. 2, in particular the extensometer sections 11 and 13 are coupled to each other through a structural flexure support system indicated generally at 15, including a pair of extensometer support flexure straps 16 and 17. The straps 16 and 17 are held in a mounting block assemblies 16A and 17A at first ends thereof to the respective extensometer sections 11 and 13, and as will be explained, the opposite ends of straps 16 and 17 are supported through an alignment flexure beam assembly 18 that includes blocks to hold the opposite ends of straps 16 and 17 and which includes an alignment flexure beam 19. The alignment flexure beam 19 will exert a spring force urging the extensometer sections 11 and 13 against the specimen 12.

The specimen 12 as shown in cylindrical and is adapted to be held in loading grips at its opposite ends and loaded in a load frame in a normal manner. In particular, the specimen 12 is subjected to axial load along its central axis indicated generally at 20. This is the longitudinal axis of the specimen 12 and is the loading axis.

The extensometer section 11 is of suitable design, and is operated in a well known manner. It includes a first arm 21 at its upper end which supports a conical point specimen contact pin 22, the end of which is urged in place against the specimen in a suitable manner. The pin 22 is clamped in place on the first arm 21 with a clamp block 22A. The conical point of pin 22 engages the specimen 12 as shown under a desired load against the specimen so that the pin 22 will move with the surface of the specimen whenever the specimen elongates.

It should be noted that mechanically the extensometer assembly may be used with any orientation relative to the horizontal. Thus, "upper," "top," "bottom," "up," "down" and similar words are for convenience in description only.

The arm 21 as shown in FIG. 1 includes an arm portion 24 which is spaced from the specimen and extends downwardly to form a support for the arm. At the end of arm 24, there is a cross flexure assembly indicated generally at 26 which is a well known design and is explained in the prior art U.S. Pat. No. 3,789,508 previously mentioned. The cross flexure assembly 26 includes a first cross flexure element 27 having one end clamped to the arm 21 with a suitable block 28. A second cross flexure element 30 is also mounted to arm 21, but inwardly from the block 28. The flexure element 30 has a plane that is at right angles to the plane of the first flexure element 27. Flexure element 30 is clamped in place at one end with a clamp block 31 in a suitable manner to the arm 21.

The flexure element 30 is narrowed in its center so that is will pass through a provided opening in the center of the flexure element 27 as shown in the prior art. The flexure element 30 is widened out at its outer ends where it is mounted with the block 31. The aperture in flexure element 27 is of suitable size to permit the spring flexure element 30 to pass through the aperture, as shown and explained in U.S. Pat. No. 3,789,508. The flexure element 27 corresponds to the member 13 in said patent, and the flexure element 30 corresponds to the member 37 in that patent.

The extensometer section 11 also includes a second conical point contact pin 35 having a specimen engaging point which engages the specimen under spring force. The contact pin 35 is clamped onto a second arm 36 in a suitable manner with a clamp block 35A. The arm 36 in turn is supported on the two flexure elements 27 and 30 at the ends thereof that are not mounted to the arm 21. The flexure element 30 is clamped to the arm 36 with a mounting block 37, and the end of the flexure element 27 (opposite from block 28) is clamped between two sections of the arm 36, one of which forms a clamp block 38. The cross flexures 27 and 30 will permit pivoting of arms 21 and 36 about an axis formed along the line at the intersection of the planes of the flexure elements 27 and 30.

It can be seen that the pins 22 and 35 can move in direction along the axis 20 relative to each other, and there is little or no restraint against such movement through the spring flexure elements 27 and 30. The spring flexures are leaf spring members. The flexure elements 27 and 30 are stiff in all other degrees of freedom.

The points of pins 22 and 35 engage the specimen when the arms are clipped to the specimen as will be explained. If desired, the extensometer arms can be attached to the specimen with rubber bands that cause the points of the pins 22 and 35 to engage the specimen 12 at desired locations. Thus any time the specimen 12 tends to elongate, the flexure elements 27 and 30 will be subjected to bending strain, which strain can be measured with bonded wire strain gages mounted on the flexure elements in the normal manner and shown at 27A, for example.

The extensometer assembly 10 as stated, includes the second extensometer section 13 which is an extensometer which will also measure axial elongation of the specimen 12. The alignment or support system for connecting the two extensometers 11 and 13 together is made to provide certain degrees of freedom and also restraint against movement in selected directions.

As stated the support system 15 includes a pair of extensometer support flexure straps 16 and 17. The flexure straps 16 and 17 are flat strap spring members having rectangular cross sectional configurations. They are flat, heat treated springs. The end of the specimen support strap 16 opposite block 16A of alignment flexure beam assembly 18 is clamped to a laterally extending portion 39 of arm 21. The portion 39 has a groove defined therein as shown at 41 in FIG. 1, and a clamping block 42 is provided to hold the support strap 16 tightly clamped in place. The blocks holding the straps and flexure beams are held in place with clamping cap screws. The strap 16 fits into the groove 41 an plate 42 has a pair of ribs 46, one at each end thereof (see FIG. 4) which bear against the flexure strap 16 along two spaced lines to tightly clamp the first end of strap 16 in place.

Figure 4:
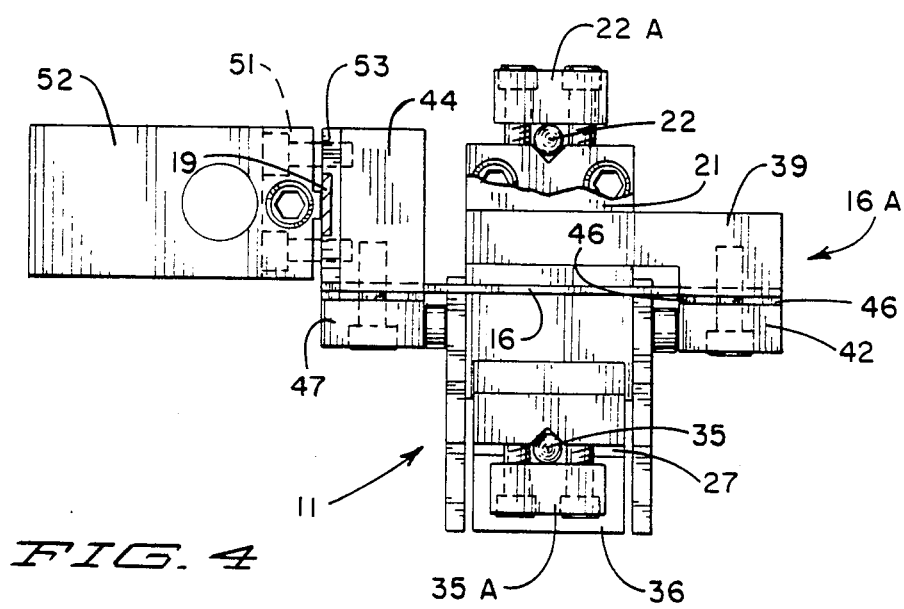
FIG. 4 is a sectional view taken along line 4—4 in FIG. 1.

As seen in FIG. 4, the extensometer support flexure strap 16 is positioned between the arms 21 and 36 of extensometer section 11 and extends transversely to the specimen. The second end of strap 16 is placed in a groove formed in a surface of a block 44 with a suitable clamp plate 47 made with the clamp ribs in the same manner as the clamp plate 42. Thus the opposite end of extensometer support flexure strap 16 is supported in the block 44 and a support connection is made between the extensometer section 11 and the alignment beam flexure assembly 18.

The extensometer support flexure strap 16 is bendable about an axis lying in the plane of the strap and perpendicular to the axis of the specimen 12 (and to the longitudinal axis of the strap 16). The strap resists moments about any axis perpendicular to the plane of the strap, or in other words it resists bending about axes parallel to the axis of specimen 12. The strap 16 will also bend easily in torsion about its longitudinal axis.

The block 44 is rectangular and has an end surface 50 perpendicular to the surface on which the end of strap 16 is supported. The surface 50 is provided with a groove for receiving one end of the alignment flexure strap or beam 19, and the alignment flexure beam 19 is clamped in the groove with a clamp portion of an installation arm or clip indicated generally at 51 which has a surface provided with spaced apart lugs that bear against the end of the alignment flexure beam 19. The installation arm includes a finger clip pad 52 that extends outwardly from the block 44 and clamp plate 47, and is accessible for grasping with the thumb or the fore-finger of an operator as will be explained. The extensometer assembly 10 can be gripped and the specimen contact points of the extensometer sections may be spread apart for installation on a specimen.

The finger clip pad 52 is made as a separate piece fastened to the clamping portion of arm 51.

It also should be noted that the block 44 has a clearance recess indicated at 53 on surface 50, so that the clamped end of the alignment flexure beam 19 is of the desired length to maximize the bendable length of the alignment flexure beam 19.

Figure 3:
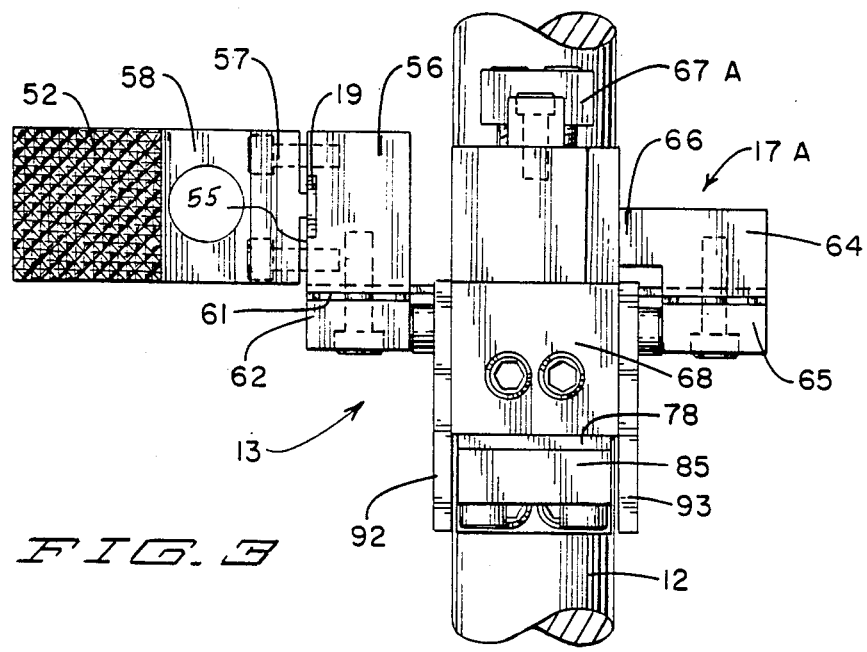
FIG. 3 is a side view thereof taken generally along line 3—3 in FIG. 1.

The alignment flexure beam 19 extends laterally across the specimen 12 at right angles to strap 16 as can perhaps best be seen in FIG. 2, and is received in a groove on a surface 55 of a block 56 (see FIGS. 2 and 3). The opposite end of the strap 19 from block 47 is clamped into the groove in the surface 55 of the block 56 with a second installation arm 57 which also has a finger clip portion 58 fastened thereto in a suitable manner. The block 56 also has a bend clearance recess 59.

The blocks 44 and 56 are thus spaced apart, as are the installation arms 51 and 57. The span between these two blocks is determined by the effective length of the alignment beam 19 that is used. The effective length of the alignment flexure beam 19 is determined by the gage length of the specimen, that is the diameter of the specimen on the diametral line that is used for a measuring plane with the extensometers.

The block 56 in turn mounts one end of the extensometer support strap 17, that was previously mentioned. Strap 17 is supported on a surface 61 of block 56 at 90° to the surface 55, and is held in place with a clamp plate 62 fastened with suitable cap screws in the usual manner to block 56. Note that in FIG. 2 the bottom view is shown, so that the clamp plate 62 is in view, and the orientation of plate 62 and block 56 can be seen in FIG. 3.

Thus, the clamp blocks 44 and 56 support the alignment beam 19, which is a spring flexure beam so that the plane of the strap 19 is perpendicular to the planes of the straps 16 and 17, and the beam 19 extends laterally thereto so that the alignment beam 19 spans the specimen 12 and couples the extensometer sections 11 and 13 together.

The first end of the extensometer support strap 17, as previously mentioned, mounts in the mounting block assembly 17A for supporting the extensometer 13. Block assembly 17A includes a clamp block 64 that has a recess which receives the second end of the extensometer support strap 17. A clamp plate 65 which has spaced lugs that bear against the surface of the strap is clamped against strap 17 to hold it securely in the recess in the block 64 as previously explained.

The block 64 is a laterally extending porton of an extensometer arm 66 forming part of the extensometer section 13 (see FIG. 1). Extensometer arm 66 is directly across the specimen from the arm 21. The arm 66 has a conical point specimen contact pin 67 clamped thereto with a clamp block 67A. This pin 67 is a specimen engaging pin and is positioned as can be seen in FIG. 1 directly opposite the pin 22 on specimen 12.

The arm 66 has a depending leg 68 spaced from the specimen 12, corresponding to leg 24 on arm 21, and at the lower end of the leg 68 there is a cross flexure assembly 70 that is substantially identical to the cross flexure assembly 26 operable to connect the arm 66 to a second arm 75 for the extensometer section 13. As shown, a first flexure element 71 has one end clamped with suitable clamp plate 72 to a portion of the arm 68. Clamp plate 72 is held in place with cap screws in the usual manner. The opposite end of flexure element 71 is held in place on an end surface of arm 75, with a suitable clamp plate 76 as shown in FIG. 1 in the usual manner. The arm 75 has an upwardly extending lug portion 77 that supports an end portion of a second flexure element 78 of the flexure assembly 70, which is clamped in place with a block 82 that is also used for supporting a second conical point specimen engaging pin 83 of the arm assembly 75 of the second extensometer. The pin 83 is held in place on arm portion 82 with a suitable block 84 in a usual manner.

The second end of the flexure element 78 is held in place with a suitable clamp block 85 to a lower lug portion of the leg 68 in a usual manner.

The flexure element 78 has an opening in the center through which the flexure element 71 passes in the normal manner, and thus the lower arm 75, and the contact pin 83 connected thereto can flex easily as the pins 67 and 83 move relative to each other. Thus if the test specimen 12 elongates, or shortens, the distance between the two pins will be measured. Suitable strain gages for example those indicated at 78A on flexure element 78 can be used for measuring the strain in the normal manner.

The extensometer sections 11 and 13 generally have shield plates in suitable places, as is conventionally done. For example, the extensometer 11 includes plates 90 and 91 on opposite sides thereof to shield and protect the flexure assembly 26, and the extensometer 13 has shield plates 92 and 93, respectively to shield the flexure assembly 70.

As shown in FIG. 5, the alignment beam 19, which is a spring of suitable construction, is prebent, desirably, but not necessarily, so that when the points of the specimen contact pins 22, 35, 67 and 83 are not engaging the specimen 12, the at rest position of the alignment beam 19 may be such as that shown in FIG. 5. Th specimen engaging contact pin points on one extensometer section are close to the specimen engaging contact pin points of the other extensometer section. Then when the finger grip members 52 and 58 are grasped with a thumb and fore-finger, the extensometer sections 11 and 13 can be spread apart by overcoming the force from the alignment beam 19, and clipped onto a specimen 12 quite easily.

The showing in FIG. 2 illustrates that the alignment beam 19 is substantially straight when the points are engaging a specimen of the correct gage diameter. The alignment beam 19 can be adjusted by loosening the clamp blocks 51 and 57 that are clamping the ends of the alignment beam. For example the extensometer sections could be moved together slightly for smaller diameter specimens from that shown in FIG. 2.

The extensometer support straps 16 and 17 bend easily about axis parallel to their plane and perpendicular to their longitudinal axes. When the straps 16 and 17 as shown are positioned exactly midway between the points of contact pins 22 and 35, and 67 and 83, respectively, the strain gaged alignment beam 19 will measure the average change in diameter of the specimen at the first diametral measuring plane 96 (FIG. 1) and a second diametral measuring plane 97. The diametral planes 96 and 97 are planes perpendicular to the axis 20 and passing through the contact points of pins 22, 67 and 35, 83, respectively. The extensometer sections easily flex relative to each other if there is torsion in the specimen. This degree of freedom is accommodated through opposite cantiliver bending in the extensometer section support flexure straps 16 and 17. If, there is a difference or a change in diameter from one end of the specimen to the other, as sensed at the diameter line between the points of pins 22 and 67 in relation to the diameter line between the points of pins 83 and 35, this degree of freedom is accommodated by twisting (torsional windup) of straps 16 and 17.

The straps 17 and 16 will twist in torsion about their longitudinal axes relatively easily, but the strap 19 is rigid in this degree of freedom and resists moments and forces generated from one extensometer section to the other caused by differences in diameter of the specimen between the two measuring planes. Because the alignment beam 19 bends easily about axes parallel to the specimen axis, changes in diameter of specimen 12 at either or both measuring planes 96 and 97 will cause bending of the alignment beam 19 which can be measured with strain gages 100. When the straps 16 and 17 are midway between the respective contact point, the average diametral change is measured by the bending of alignment beam 19. The straps 16 and 17 may be shifted to be closer to one set of contact points or the other if desired, which would change or modify the information included in the signal indicating bending of beam 19. For example, if the straps 16 and 17 were closer to the points of pins 22 and 67, the changes in diameter of the specimen at plane 96 would result in more movement of alignment beam 19 than the same diametral change at plane 97. If the planes of straps 16 and 17 lie along either plane 96 or 97, only the change in diameter of such measuring plane would be measured. The specimen contact point pins which then would be spaced from the straps would have to be biased against the specimen in some manner.

If for example the specimen bends when testing so that the distance between points of pins 67 and 83 differs slightly from that between points of pins 22 and 35, by hooking the strain gages 78A and 27A to a bridge connected to an electrical averaging circuit or amplifier, then the average elongation of the specimen is provided, and the bending effect is cancelled in the output signal.

Also note that the effective mounting of the ends of the straps 16 and 17 is made so that the bisecting plane of each of the straps 16 and 17 perpendicular to the plane of the straps and extending transversely to the straps passes through the axis of the specimen 12. This is shown in FIG. 2, for example.

In FIG. 6 a modified form of the present invention is shown wherein the alignment flexure beam assembly 18 and the alignment beam 19 are replaced with a flexure beam assembly comprising a cross flexure assembly shown at 109 such as that used on the extensometer arms.

Essentially, the extensometer sections in FIG. 6 are numbered in the same manner as before, and the support straps 16 and 17 are shown. FIG. 6 corresponds to FIG. 2 and is a bottom plan view. The strap 16 in this form of the invention has its end opposite from clamp block assembly 16A clamped to a block 110 using a clamp plate in the normal manner. Block 110 has an extension lug 111 that extends toward the bisecting plane between the extensometer section and passing through the specimen axis. This extension lug 111 mounts one end of a first alignment flexure element 112, held in place with a suitable clamp plate 113. An attachment arm 115 in this form of the invention clamps against the block 110 and clamps a first end of a second flexure element 117 into place.

The second end of flexure element 112 is clamped to a lug 120 with a clamp plate 122. Lug 120 in turn is mounted on a second attachment arm 121. The attachment arm 121 in turn is clamped in a suitable manner to a mounting block 123 which not only mounts the outer end of the flexure element 117, but in this form of the invention also clamps the second end of the support strap 17 to support extensometer section 13 in alignment with extensometer section 11. Thus, it can be seen that flexure elements 112 and 117 intersect, and the element 112 passes through an opening in the flexure element 117 in the same manner as that used for mounting the extensometer arms of each extensometer section.

It can now be seen that the mounting and alignment assembly 109 between the respective extensometers 11 and 13 is very rigid in any torsional movement between the two extensometers. Any movement that would be occasioned by changes in diameter at the measuring planes 96 and 97 on the specimen, and thus any movement such as that would result in torsion on the straps 16 and 17 will be rigidly resisted by cross flexure arrangement of the mounting and alignment assembly 109. The assembly 109 may use prebent flexure elements that will exert sufficient force to keep the points of contact pins of the extensometer sections urged against the specimen.

Thus it can be seen that in both forms of the invention the ability to measure axial changes, as well as diametral changes is achieved. The degrees of freedom that are provided include:

(a) the ability to accommodate a difference or a change in diameter of one end of the specimen in relation to the other, that is, a difference or change in diameter at measuring plane 96 in relation to plane 97. This degree of freedom is accommodated by torsion in the extensometer section support flexure straps 16 and 17;

(b) twisting of the specimen torsionally about its axis 20 may occur, which would cause one of the extensometer sections to shift relative to the other, and this is permitted by the bending of the extensometer section support flexure straps 16 and 17;

(c) one side of the specimen may shift in an axial direction in relation to the other side of the specimen, and this is also accommodated by a combination bending and torsion in the extensometer section support flexure straps 16 and 17; and (d) both ends of the specimen may increase or decrease in diameter equally, which is accommodated with the bending in either the alignment flexure beam 19 or in the cross flexure mounting and alignment assembly 109.

It should also be noted that if one end of the specimen changes in diameter relative to the other, while the straps 16 and 17 will bend in torsion and permit this, the average change will also be reflected by bending in the alignment beam 19 or the cross flexure mounting and alignment assembly 109.

The degrees of restraint of the mounting and alignment system system are such that each of the extensometer sections is maintained diametrically opposed to the other, and there is only negligible rotation of one relative to the other torsionally about the specimen when the specimen diameter changes; and there is a beam like stiffness of each extensometer section in the diametral measurement direction of the specimen.

The restraints are such that during the shifts or movements of the specimen described above, the support system, including the straps 16 and 17 and the alignment beam 19, (or the cross flexure alignment assembly 109) do not restrain the extensometer sections sufficiently so that they might cause the contact pins to slip on the specimen. Further, the support structure is arranged such that the unwanted movements do not affect the measurements.

If the extensometer section support straps 16 and 17 are shifted to be closer to one of the set of specimen contact pins or the other, these support straps can be preshaped with a twist to add additional force against the specimen by the distant conical point contact pin, so that this distant pin will have adequate force urging it against the specimen.

Although the present invention has been described with reference to preferred embodiments, workers skilled in the art will recognize that changes may be made in form and detail without departing from the spirit and scope of the invention.

What is claimed is:

1. In an extensometer assembly comprising first and second extensometer sections, said extensometer sections each having means for measuring changes in length along a longitudinal measuring axis of a specimen the improvement comprising:
   a support system for supporting the extensometer sections relative to each other on substantially opposite sides of a specimen comprising first and second extensometer support means, each connected to a different one of the extensometer sections, said support means flexing easily about axes perpendicular to the axis of a specimen with which the extensometer sections are used and resisting bending about axes parallel to the longitudinal axis of such specimen; and
   alignment beam means extending across the specimen for coupling said first and second support means to each other, said alignment beam means permitting resilient bending about an axis generally parallel to the axis of a specimen with which the extensometer sections are used, and resisting substantial movement about other axes.

2. The apparatus of claim 1 wherein the first and second extensometer support means each comprises spring straps having planes generally perpendicular to the axis of a specimen with which the extensometer sections are used.

3. The apparatus of claim 2 wherein said alignment beam means includes first and second attachment block means coupled to ends of said spring straps, respectively, the alignment beam means being fixed to and extending between said first and second attachment blocks.

4. The apparatus of claim 1 wherein said alignment beam means comprises block members supporting the opposite ends of said extensometer support means, a cross flexure assembly coupling the block members together, said cross flexure assembly comprising a pair of flexure straps positioned substantially at right angles to each other and having an intersection axis generally parallel to the axis of a specimen with which the extensometer sections are used, first ends of both flexure straps being connected to a block member for a first extensometer section and second ends of both flexure straps being connected to a block member for a second extensometer section.

5. The apparatus of claim 1 wherein said alignment beam means includes a spring member that exerts a resilient force tending to urge the extensometer sections toward each other to create a resilient force urging said means for measuring changes against a specimen with which the extensometer sections are used.

6. An extensometer assembly comprising first and second extensometer sections, said extensometer sections each having a pair of spaced specimen contact point means adapted to be engaged against a specimen having a longitudinal measuring axis, the contact point means of each of the specimen sections defining a plane passing through the measuring axis of such specimen and the contact point means of the other section when installed on a specimen;
   each extensometer section including means for measuring the changes in separation between the contact point means of the respective section;
   a support system for supporting the extensometer sections relative to each other comprising first and second extensometer support straps, each of such support straps having a first end connected to a different one of the extensometer sections, said support straps having elongated longitudinal axes extending generally perpendicular to the axis of the specimen on opposite sides of the specimen, said support straps extending so that second ends thereof are laterally spaced from the specimen; and
   an alignment beam assembly extending across the specimen and coupling the second ends of said support straps to each other, said alignment beam assembly being oriented to permit resilient bending about an axis generally parallel to the axis of a specimen with which the assembly is used, and to resist substantial movement about other axes.

7. The apparatus of claim 6 wherein said alignment beam assembly includes first and second attachment block means for coupling to the second ends of said extensometer support straps, respectively, and a flat flexure beam having a plane generally parallel to the axis of a specimen and being fixed to said attachment block means and extending to span a specimen with which the extensometer assembly is used.

8. The apparatus as specified in claim 7 wherein said extensometer support straps have first ends that extend laterally of a specimen axis substantially the same distance as the extension of the second ends thereof where such second ends are coupled to the attachment block means.

9. The apparatus as specified in claim 7 wherein said extensometer sections include arm portions extending in a direction laterally of the specimen to position the first ends of the extensometer support straps laterally of a specimen with which the extensometer assembly is used, said alignment beam assembly being positioned on an opposite side of said specimen from the first ends of the extensometer support straps.

10. The apparatus of claim 6 wherein said alignment beam assembly comprises block members supporting the opposite ends of said extensometer support straps, a cross flexure assembly coupling the block members together, said cross flexure assembly comprising a pair of flexure straps positioned substantially at right angles to each other and having an intersection axis generally parallel to the axis of such specimen, first ends of both flexure straps being connected to a block member for a first extensometer section and second ends of both flexure straps being connected to a block member for a second extensometer section.

11. The apparatus of claim 6 wherein said alignment beam assembly includes a spring member that exerts a resilient force tending to urge the contact point means of both extensometer sections toward each other, and to create a resilient force when the contact point means are engaging a specimen urging said contact point means against such specimen.

12. The apparatus as specified in claim 11 and means to measure the amount of bending about an axis in the alignment beam assembly parallel to the axis of such specimen caused by changing in diameter of the specimen.

13. The apparatus as specified in claim 6 wherein said extensometer support straps comprise generally flat straps which are coextensive along their lengths and which are spaced apart at substantially equal distances at aligning points along their coextensive lengths and said straps being positioned at a desired location between the specimen contact point means of the respective first and second extensometer sections.

14. An extensometer assembly comprising a pair of extensometer sections, said extensometer sections each having first and second spaced specimen contact point means adapted to be engaged against a specimen having a longitudinal measuring axis, the first and second contact point means of each of the extensometer sections defining a plane passing through the measuring axis of such specimen and the contact point means of the other section when installed on a specimen, the first contact point means of both of the extensometer sections defining a first diametral plane relative to such specimen and the second contact point means of both of the extensometer sections defining a second diametral plane spaced along such measuring axis from the first diametral plane;

each extensometer section including means for measuring the changes in separation between its first and second contact point means;

support straps having elongated longitudinal axes extending generally perpendicular to the axis of the specimen on opposite sides of the specimen, said support straps having first ends coupled to a respective extensometer section and second ends thereof being laterally spaced from the specimen; and an alignment beam assembly extending across the diameter of the specimen and coupling the second ends of said support straps together, the alignment beam assembly permitting resilient bending about an axis generally parallel to the longitudinal measuring axis of a specimen with which the extensometer assembly is used, and to resist substantial movement about other axes.

15. The apparatus of claim 14 wherein the support straps have planes when straight substantially perpendicular to the first mentioned plane passing through the contact point means and the measuring axis.

16. The apparatus of claim 15 wherein the support straps are located substantially midway between the contact point means of the respective extensometer sections.

* * * * *